Sept 8, 1925.
J. E. GEORGIA
1,552,553
PNEUMATIC DUST COLLECTING AND CONVEYING APPARATUS
Filed Sept. 15, 1923
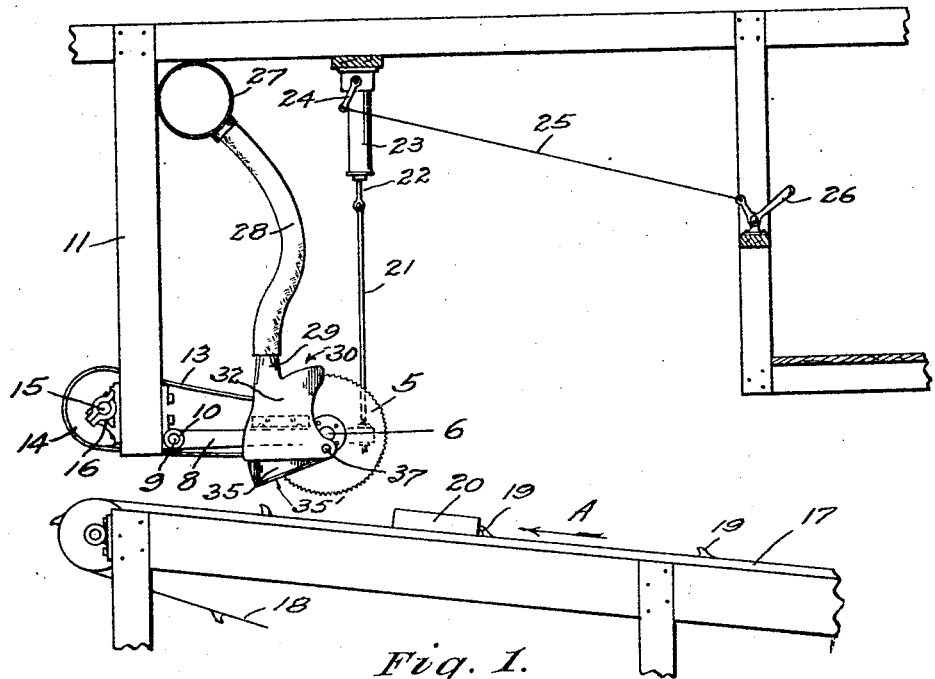
Fig. 1.
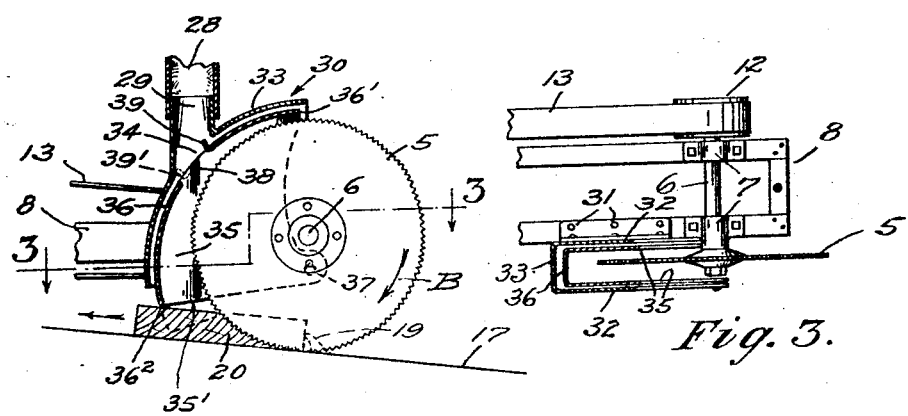
Fig. 2.
Fig. 3.
INVENTOR
Joseph E. Georgia
BY
Pierre Barnes
ATTORNEY Patented Sept. 8, 1925.

1,552,553

UNITED STATES PATENT OFFICE.

JOSEPH E. GEORGIA, OF SNOQUALMIE FALLS, WASHINGTON.

PNEUMATIC DUST COLLECTING AND CONVEYING APPARATUS.

Application filed September 15, 1923. Serial No. 662,805.

*To all whom it may concern:*

Be it known that I, JOSEPH E. GEORGIA, a citizen of the United States, residing at Snoqualmie Falls, in the county of King and State of Washington, have invented certain new and useful Improvements in Pneumatic Dust Collecting and Conveying Apparatus, of which the following is a specification.

This invention relates to pneumatic dust-collecting and conveying apparatus.

Its object is to provide new and improved devices of this character which is designed more especially for use with swing cut-off saws of saw mills or the like for automatically rendering the dust conveying devices operative with respect to the successive cutting operations of the saw.

More specific objects and advantages of the invention will appear in the following specification.

The invention consists in the novel features of construction and combinations of the same as hereinafter described and claimed.

In the accompanying drawing,—

Figure 1 is a view in side elevation of my improved dust-collecting device applied to a swing cut-off sewing machine. Fig. 2 is a detail side elevation of the saw and outer portion of the saw frame, the inlet end of the dust collector being shown in vertical longitudinal section. Fig. 3 is a sectional plan view taken substantially through 3—3 of Fig. 2.

Referring to the drawing, the reference numeral 5 represents a circular saw secured on an arbor 6, which is journaled in suitable bearings 7 on the outer portion of a frame 8. The saw frame, as shown in Fig. 1, is mounted to swing loosely on a shaft 9 as a fulcrum, the said shaft being supported in suitable bearings, such as 10, secured to frame-work 11 in the rear of the saw. On the arbor 6 is secured a pulley 12, about which passes a belt 13 which also passes about a pulley 14 secured on a power driven shaft 15 which is journaled in bearing boxes such as 16 secured to the said framework 11.

17 represents a table upon which is provided a plurality of conveyor chains or belts such as 18 having thereon spaced attachments 19 whereby the material, such as a board 20, is caused to travel in the direction indicated by arrow A for the purpose of being cut-off or trimmed by the saw 5.

The saw is normally held out of engageable relations with the board or work 20 by means of a hoisting rig which, for example, is illustrated in Fig. 1 as comprising a link or cable 21 connecting the saw frame 8 with a rod 22 which may be connected to a piston (not shown) provided in a stationary cylinder 23. The power medium operating in said cylinder for effecting the elevation of the saw is regulated by a valve (not shown) which is operated as by means of an arm 24 which, in turn, is connected by a cable 25 with a manually operated controlling lever 26.

The above described parts are or may be of known or suitable construction.

Instead of using steam or compressed air as the power medium for elevating the saw, any other suitable known power means may be employed.

In the present invention, 27 represents a pipe leading to a suction or exhaust fan (not shown) said pipe having an air inlet which is connected to an end of a flexible pipe or tube 28 whose other end is connected to a tubular spout 29 of a hood 30 which is rigidly secured as at 31 to the swing saw frame 8.

The hood 30 consists of two spaced side walls 32 which are joined or formed integral with an arcuate wall 33 of a radius approximating that of the saw 5, which extends into the hood from the front as shown. At about its midlength the wall 33 is provided with an outlet 34 through which communication is had with the spout 29 and the suction pipe connection 28.

The bottom edges of the hood walls at the sides and rear of the saw are disposed at an elevation with respect to the saw to have the latter protrude below the hood to a distance somewhat greater than the maximum thickness of the work which is to be cut by the saw.

Provided within said hood is an inner hood which, like the outer hood 30, has side walls and an arcuate peripheral wall, indicated respectively by 35 and 36. The inner hood is pivotally connected by pins 37 with the outer hood, said pins being in alignment with each other and disposed in axial relations with the arcuate walls 33 and 36 of both said hood members.

The axis pins 37 for the inner hood, moreover, are arranged in eccentric relations with respect to the axis of the saw arbor 6 so that the upper or forward edge 36¹ of the inner hood plate 36 will be in close proximity of the periphery of the saw and the rear lower edge 36² thereof will be spaced a relatively greater distance from the saw periphery as shown in Fig. 2.

The wall 36 of the inner hood is provided intermediate its length with a port 38, at the upper or forward side of which the inner hood is provided with a projection 39 extending into the outlet 34 of the outer hood. The projection 39 is engageable with the hood wall 33 at the rear side of the outlet 34 and serves as a stop therewith to limit the downward relative movement of the inner hood. The body of the inner hood is so arranged with relation to its pivotal support that the action of gravity tends to retain the inner hood in its lowermost position as limited by the projection or stop 39 encountering, as indicated by 39¹ Fig. 2, the outer hood wall 33, whereupon the hood wall 36 acts as a valve to stop communication between the chamber of the inner hood and the draw-off connection afforded by the spout 29.

When in its last described or normal position the inner hood projects below the lower edges of the outer hood. The lower edges 35¹ of the inner hood side walls are inclined from a horizontal plane as shown in Figs. 1 and 2.

In operation, the saw driven in the direction of arrow B in Fig. 2, if required to cut the work as 20, is lowered in front of the latter so as to engage the same. As the work travels onward it engages the sloping lower edges 35¹ of the inner hood side walls thereby elevating the same to impart a revoluble movement of the arcuate wall 36 with respect to its axis 37 resulting in the opening 38 of the inner tube being brought into register with the spout opening 34.

When this occurs the suction or partial vacuum obtaining in the chamber of the inner hood acts to effect the withdrawal through the spout 29 of the saw dust produced by the saw while cutting the work.

What I claim, is,—

1. In apparatus of the character described, a hood provided with a discharge opening, said hood being mounted for movement toward and from the work, and a valve member connected to said hood and arranged to automatically close the hood opening, said valve-member being adapted to be influenced by the work to move the valve-member into its open position with respect to the hood opening when the hood is moving toward the work and permitting the valve-member to close when the hood is moving from the work.

2. In apparatus of the character described, the combination with a swing saw, the frame therefor and a suction pipe, of a hood member secured to said frame, a second hood member connected with the first named member for relative vertical movements, said hood members being provided with openings arranged to be in communicating and closed relations with each other when the second named member is in its upper and lower positions respectively with relation to the first named member, and communicative connections between the opening of the first named member and said suction pipe.

3. In apparatus of the character described, the combination with a circular saw, a swingable frame therefor, and a suction pipe, of a hood secured to said frame, said hood having an opening therein, flexible pipe connections between said hood opening and the suction pipe, a second hood provided within the aforesaid hood and pivotally connected therewith so that the second hood will normally protrude below the bottom of the first named hood, said second hood having an opening therein which is arranged to register with the opening of the first named hood when the second named hood is in its elevated position, and a stop for limiting the downward movement of the second hood with respect to the first named hood.

4. In a swing-saw machine, a hood mounted to travel with the movable frame of the machine, said hood being provided with a discharge opening, and a gravity closing valve for said opening, said valve being regulated by engaging the work to afford a passage through said opening.

Signed at Snoqualmie Falls, Wash., this 28th day of August 1923.

JOSEPH E. GEORGIA.